(12) United States Patent
Tsunoda

(10) Patent No.: US 11,451,947 B2
(45) Date of Patent: Sep. 20, 2022

(54) SYSTEM, INFORMATION PROCESSING APPARATUS, METHOD, AND STORAGE MEDIUM STORING A PROGRAM

(71) Applicant: CANON KABUSHIKI KAISHA, Tokyo (JP)

(72) Inventor: Masami Tsunoda, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 163 days.

(21) Appl. No.: 16/741,929

(22) Filed: Jan. 14, 2020

(65) Prior Publication Data

US 2020/0154255 A1 May 14, 2020

Related U.S. Application Data

(63) Continuation of application No. 15/057,697, filed on Mar. 1, 2016, now Pat. No. 10,575,158.

(30) Foreign Application Priority Data

Mar. 18, 2015 (JP) ................................. 2015-055355

(51) Int. Cl.
*H04W 4/80* (2018.01)
*H04W 84/18* (2009.01)
*H04W 8/00* (2009.01)
*H04W 76/14* (2018.01)

(52) U.S. Cl.
CPC ............. *H04W 4/80* (2018.02); *H04W 84/18* (2013.01); *H04W 8/005* (2013.01); *H04W 76/14* (2018.02)

(58) Field of Classification Search
CPC ....... H04W 4/80; H04W 84/18; H04W 76/14; H04W 8/005
See application file for complete search history.

(56) References Cited

U.S. PATENT DOCUMENTS

| | | | | |
|---|---|---|---|---|
| 7,463,894 B2 * | 12/2008 | Fano | ...................... | H04W 8/005 455/414.1 |
| 7,619,757 B2 | 11/2009 | Okutsu et al. | | |
| 7,689,596 B2 | 3/2010 | Tsunoda | | |
| 8,243,301 B2 * | 8/2012 | Ogura | ................... | G06F 3/1208 358/1.14 |
| 8,699,952 B2 * | 4/2014 | Yeung | ................... | H04W 84/18 455/73 |
| 8,774,041 B2 * | 7/2014 | Akay | ..................... | H04W 12/50 709/204 |
| 8,830,496 B2 * | 9/2014 | Itogawa | ............. | H04N 1/00896 358/1.14 |
| 9,436,424 B1 * | 9/2016 | Khafizova | ........... | G06F 3/04817 |
| 9,712,707 B2 * | 7/2017 | Nagasawa | .......... | H04N 1/00915 |

(Continued)

FOREIGN PATENT DOCUMENTS

JP 2007-166538 6/2007

*Primary Examiner* — Jinsong Hu
*Assistant Examiner* — Rui M Hu
(74) *Attorney, Agent, or Firm* — Venable LLP

(57) ABSTRACT

In response to receiving an acquisition request for acquiring wireless connection information from an external apparatus, it is determined whether or not a sensor for detecting a nearby object has detected an object. If it is determined that the sensor has detected an object, the wireless connection information is transmitted to the external apparatus. If it is determined that the sensor has not detected an object, the wireless connection information is not transmitted to the external apparatus.

26 Claims, 13 Drawing Sheets

(56) References Cited

U.S. PATENT DOCUMENTS

| | | | | |
|---|---|---|---|---|
| 9,766,849 B2* | 9/2017 | Kim | | G06F 3/0346 |
| 10,048,497 B1* | 8/2018 | Ran | | G02B 27/017 |
| 10,149,278 B2* | 12/2018 | Borges | | H04W 8/005 |
| 10,575,158 B2* | 2/2020 | Tsunoda | | H04W 84/18 |
| 2003/0038965 A1* | 2/2003 | Simpson | | G06K 15/00 |
| | | | | 358/1.15 |
| 2004/0004735 A1* | 1/2004 | Oakeson | | G06F 3/1212 |
| | | | | 358/1.14 |
| 2006/0227371 A1* | 10/2006 | Roksz | | G06F 21/608 |
| | | | | 358/1.14 |
| 2006/0252411 A1* | 11/2006 | Huckins | | H04W 12/08 |
| | | | | 455/411 |
| 2007/0024892 A1* | 2/2007 | Cho | | G06K 15/00 |
| | | | | 358/1.14 |
| 2007/0033287 A1* | 2/2007 | Kiyose | | H04L 67/01 |
| | | | | 709/229 |
| 2008/0148344 A1* | 6/2008 | Rubio | | G06F 21/31 |
| | | | | 726/1 |
| 2008/0270814 A1* | 10/2008 | Starr | | G06F 1/325 |
| | | | | 713/323 |
| 2008/0307514 A1* | 12/2008 | Kusakari | | G07C 9/27 |
| | | | | 726/7 |
| 2009/0093215 A1* | 4/2009 | Eisenbach | | H04W 12/08 |
| | | | | 455/41.2 |
| 2009/0286479 A1* | 11/2009 | Thoresson | | H04W 12/50 |
| | | | | 455/41.3 |
| 2011/0019228 A1* | 1/2011 | Uchikawa | | H04N 1/32534 |
| | | | | 358/1.15 |
| 2011/0230139 A1* | 9/2011 | Nakahara | | H04W 48/20 |
| | | | | 455/41.2 |
| 2012/0190301 A1* | 7/2012 | Hart | | H04M 1/72412 |
| | | | | 455/41.2 |
| 2012/0258665 A1* | 10/2012 | Sip | | H04W 84/18 |
| | | | | 455/41.2 |
| 2013/0141756 A1* | 6/2013 | Miller | | G06F 3/1296 |
| | | | | 358/1.15 |
| 2013/0267277 A1* | 10/2013 | Okigami | | H04N 1/32496 |
| | | | | 455/557 |
| 2014/0038560 A1* | 2/2014 | Lee | | H04W 4/12 |
| | | | | 455/411 |
| 2014/0068717 A1* | 3/2014 | Mayes | | G06F 21/40 |
| | | | | 726/3 |
| 2014/0073244 A1* | 3/2014 | Ko | | H04L 69/14 |
| | | | | 455/41.1 |
| 2014/0127994 A1* | 5/2014 | Nightingale | | H04W 12/082 |
| | | | | 455/41.1 |
| 2014/0176991 A1* | 6/2014 | Yun | | H04N 1/00474 |
| | | | | 358/1.15 |
| 2014/0342670 A1* | 11/2014 | Kang | | H04L 69/14 |
| | | | | 455/67.11 |
| 2014/0355582 A1* | 12/2014 | Kamath | | H05K 999/99 |
| | | | | 370/338 |
| 2014/0378058 A1* | 12/2014 | Decuir | | H04W 4/80 |
| | | | | 455/41.2 |
| 2015/0009824 A1* | 1/2015 | Jeong | | H04W 48/14 |
| | | | | 370/235 |
| 2015/0038086 A1* | 2/2015 | Kim | | G06F 21/35 |
| | | | | 455/41.3 |
| 2015/0133056 A1* | 5/2015 | Kang | | H04W 76/20 |
| | | | | 455/41.2 |
| 2015/0147968 A1* | 5/2015 | Friedman | | G06F 3/017 |
| | | | | 455/41.2 |
| 2015/0271819 A1* | 9/2015 | Tomida | | H04W 76/10 |
| | | | | 455/41.2 |
| 2015/0304828 A1* | 10/2015 | Varoglu | | H04W 4/16 |
| | | | | 455/414.1 |
| 2016/0044442 A1* | 2/2016 | Pacelli | | G06Q 20/3224 |
| | | | | 455/41.1 |
| 2016/0080943 A1* | 3/2016 | Ives-Halperin | | G06Q 10/02 |
| | | | | 713/168 |
| 2016/0134773 A1* | 5/2016 | Nagasawa | | H04N 1/00933 |
| | | | | 358/1.13 |
| 2016/0269962 A1* | 9/2016 | Takahashi | | H04W 4/80 |
| 2016/0360477 A1* | 12/2016 | Saeki | | B41J 29/38 |
| 2016/0378406 A1* | 12/2016 | Kaku | | G06F 3/126 |
| | | | | 358/1.15 |
| 2017/0134609 A1* | 5/2017 | Park | | H04N 1/32776 |
| 2017/0329562 A1* | 11/2017 | Ozawa | | G06F 3/1286 |
| 2018/0227443 A1* | 8/2018 | Sakai | | H04W 8/005 |
| 2019/0191074 A1* | 6/2019 | Ikeda | | H04W 4/80 |

* cited by examiner

SYSTEM, INFORMATION PROCESSING APPARATUS, METHOD, AND STORAGE MEDIUM STORING A PROGRAM

CROSS-REFERENCE TO RELATED APPLICATIONS

This application is a Continuation of U.S. patent application Ser. No. 15/057,697, filed Mar. 1, 2016, which claims the benefit of Japanese Patent Application No. 2015-055355, filed on Mar. 18, 2015, which are both hereby incorporated by reference herein in their entireties.

BACKGROUND OF THE INVENTION

Field of the Invention

The present invention relates to a system that enables short-range wireless communication, an information processing apparatus, a method, and a storage medium storing a program.

DESCRIPTION OF THE RELATED ART

In recent years, the networking of information devices by wireless LAN has become common. A short-range wireless communication function such as NFC (Near Field Communication) or Bluetooth® is used to acquire connection information for connecting to a wireless LAN, and a connection to the wireless LAN is made based on the connection information. Such an operation is called "handover".

NFC uses a simple interface, and thus is provided within the operation unit of an information device. The handover is implemented by a user performing an operation (touch operation) to bring a terminal or the like closer to the information device (Japanese Patent Laid-Open No. 2007-166538). In the case of an information device provided with a Bluetooth interface rather than an NFC interface, the handover is implemented by exchanging connection information with a terminal that has been brought closer to the information device with the use of Bluetooth. This utilizes a mechanism of Bluetooth that measures an approach distance.

The Bluetooth technology measures the approach distance based on the amount of attenuation of radio waves. However, the propagation of radio waves is actually affected by the surrounding environment of the device, and thus a large error may occur in the measured distance. If the range of propagation of radio waves is enlarged in order to prevent the occurrence of an error, the information device may identify the approach of an object in an unintended location. Also, if there are a plurality of information devices in close distance to each other, the information device may not identify to which one it should make a connection.

SUMMARY OF THE INVENTION

An aspect of the present invention is to eliminate the above-mentioned problems with the conventional technology. The present invention provides a system that appropriately performs a handover, an information processing apparatus, a method, and a storage medium storing a program.

The present invention in one aspect provides a system comprising a first information processing apparatus and a second information processing apparatus, wherein the first information processing apparatus includes: a receiving unit configured to receive a packet transmitted by the second information processing apparatus; a first determining unit configured to determine whether or not to transmit an acquisition request for acquiring wireless connection information to the second information processing apparatus based on an intensity of radio waves received when the receiving unit received the packet; and a first transmitting unit configured to, in a case where it is determined by the first determining unit that the acquisition request is to be transmitted to the second information processing apparatus, transmit the acquisition request to the second information processing apparatus, the second information processing apparatus includes: a sensor for detecting a nearby object; a second determining unit configured to determine whether or not the sensor has detected an object in a case where the acquisition request is received by the second information processing apparatus; and a second transmitting unit configured to, in a case where it is determined by the second determining unit that the sensor has detected an object, transmit the wireless connection information to the first information processing apparatus, and in a case where it is determined by the second determining unit that the sensor has not detected an object, the second transmitting unit does not transmit the wireless connection information to the first information processing apparatus.

According to the present invention, it is possible to appropriately perform a handover.

Further features of the present invention will become apparent from the following description of exemplary embodiments with reference to the attached drawings.

DESCRIPTION OF THE EMBODIMENTS

Figure 1:
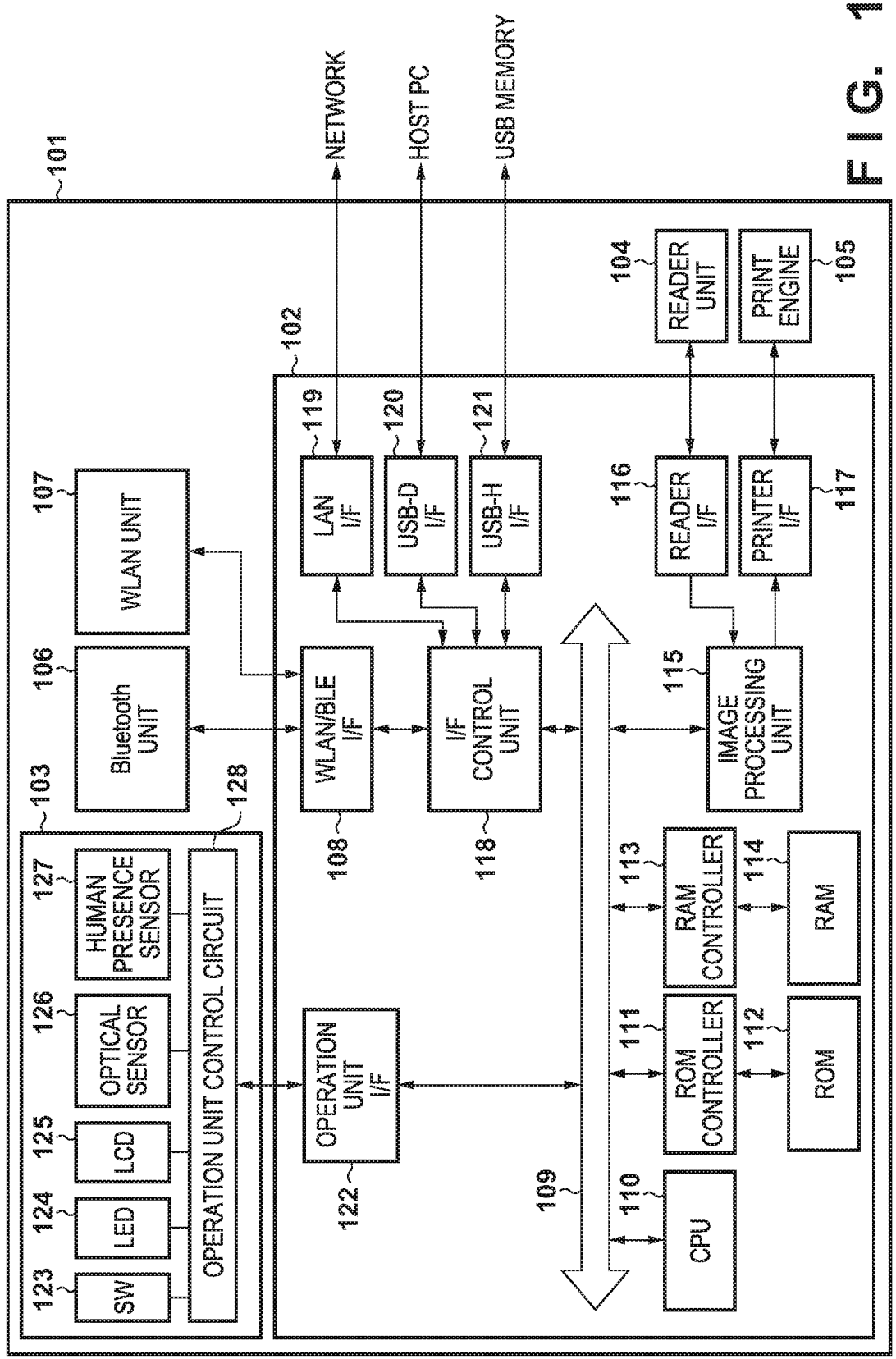
FIG. 1 is a block diagram showing an internal configuration of an image forming apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. The same constituent elements are given the same reference numerals, and a description thereof is omitted.

First Embodiment

FIG. 1 is a block diagram showing an internal configuration of an information processing apparatus according to the present embodiment. In the present embodiment, as the information processing apparatus, for example, a so-called MFP (Multi Function Printer), which is an image forming apparatus having a plurality of integrated functions such as a print function, a scan function and a fax function, is used.

An MFP 101 includes a wireless communication substrate, and in the case of executing the print function, for example, the MFP 101 receives image data, a print job and the like from an external information device via an external interface (I/F). The MFP 101 generates, based on the received data, printing data for performing printing onto a printing medium such as printing paper. A print engine 105 prints an image on the printing medium based on the printing data. In the case of executing the scan function, the MFP 101 optically reads an original placed on a reader unit 104 such as an original platen, converts the read original into image data, and outputs the image data to the external I/F.

An MFP control unit 102 is implemented by mounting various types of electric components such as an LSI, an IC and the like on a printed circuit board. The MFP control unit 102 performs overall control on the entire MFP 101. In the case of, for example, performing print processing or image reading processing based on a job received from an external information device via an external I/F, the MFP control unit 102 transmits processed data via the external I/F and controls various engines and the like.

An operation unit 103 receives an input of an instruction from a user via keys, a touch panel or the like, and displays various types of information such as apparatus information and job information on a display for the user. The operation unit 103 is brought into a low power consumption state (power saving state) or recovered from the low power consumption state under control of the MFP control unit 102. The reader unit 104 optically reads an original placed on an original platen or an ADF (Auto Document Feeder). The reader unit 104 is brought into a low power consumption state or recovered from the low power consumption state under control of the MFP control unit 102. The low power consumption state refers to a function of limiting power supply to some of the blocks, and if a user operation is not performed on the information processing apparatus for a predetermined length of time, a CPU causes the information processing apparatus to transition to the low power consumption state. If a user operation is performed on the operation unit while the operation unit is in the low power consumption state, the CPU detects an interruption signal, and causes the information processing apparatus to return to a normal state.

The print engine 105 forms an image onto a printing medium. The print engine 105 forms an image onto a printing medium by, for example, an inkjet printing method or electrophotography, and includes a printing head, an electrostatic drum, and the like. The print engine 105 is brought into a low power consumption state or recovered from the low power consumption state under control of the MFP control unit 102.

A Bluetooth unit 106 performs transmission and reception of data to and from a device with which Bluetooth communication is possible. The present embodiment will be described using Bluetooth communication as an example of short-range wireless communication. However, it is also possible to use any other communication scheme such as NFC (Near Field Communication) as long as the communication distance is shorter (the communication range is smaller) than that of a WLAN unit 107. The WLAN unit 107 performs transmission and reception of data to and from a device with which WLAN communication is possible. In the present embodiment, a wireless communication scheme according to the IEEE 802.11 standard is used as WLAN. However, it is also possible to use any other communication scheme as long as the communication distance is longer (the communication range is larger) than that of the Bluetooth unit 106. The Bluetooth unit 106 and the WLAN unit 107 are brought into a low power consumption state or recovered from the low power consumption state under control of the MFP control unit 102.

A WLAN/BLE interface unit 108 performs interface control between the Bluetooth unit 106 and the WLAN unit 107. As shown in FIG. 1, a system bus 109 is a system bus for enabling transmission and reception of data between blocks.

A CPU 110 provides instructions to the blocks via the system bus 109, and performs overall control on the MFP 101. Here, the CPU 110 encompasses an LSI configuration in which a CPU and hardware circuits, each implementing functional blocks, are included in the same package. The CPU 110 implements the operations according to the present embodiment by reading and executing a program stored in a ROM 112.

A ROM controller 111 controls reading and writing of data with respect to the ROM 112. The ROM 112 is a non-volatile memory that stores therein a boot program for activating an OS of the MFP control unit 102 and a program for performing overall control on the entire MFP 101. The ROM 112 stores therein programs for performing control of WLAN protocols, control of Bluetooth protocols, control for acquiring connection information by Bluetooth, the connection information being required to perform a connection operation to a WLAN, and the like. In addition, a program for performing power control on the MFP 101, control data and the like are also stored in the ROM 112.

A RAM controller 113 controls reading and writing of data with respect to a RAM 114. The RAM 114 is a volatile memory that acts as a main memory of the MFP control unit 102, and that is capable of high-speed reading and writing, which is also used as a work area for use in image forming processing and an area for extraction for deploying data to perform image input/output processing. In the RAM 114, data transmitted or received by WLAN, data transmitted or received by Bluetooth, and the like are also temporarily stored.

An image processing unit 115 executes image processing associated with reading processing on RGB digital image data output from a reader I/F 116, and executes image processing associated with printing processing on ink color component signals such as Y, M, C and K generated by the MFP 101. The reader I/F 116 controls transmission and reception of RGB digital image data between the reader unit 104 and the image processing unit 115. A printer I/F 117 controls transmission and reception of YMCK output video data between the print engine 105 and the image processing unit 115.

An I/F control unit 118 performs transmission and reception of jobs, image data and the like between the RAM 114 and external I/Fs such as a LAN I/F 119, a USB-D I/F 120 and a USB-H I/F 121. The LAN I/F 119 controls communication with an external information device via a network such as a LAN. The USB-D I/F 120 controls communication with an external device via a USB. The USB-H I/F 121 controls communication with a storage medium that can be removably inserted such as a USB storage unit, a card reader that enables charging control and segment designation control, and an image capturing apparatus such as a camera. An operation unit I/F 122 controls communication with the operation unit 103.

A switch (SW) 123 is a switch that can be operated by the user such as a hardware key. The CPU 110 detects a press operation performed by the user based on a press signal output from the switch 123. An LED 124 presents specific information to the user by being lighted or unlighted. An LCD 125 is a display having a dot matrix structure for displaying characters and graphics. An optical sensor 126 is used to detect the approach of an object such as a user to the MFP 101. If light directed toward the optical sensor 126 is blocked by an object while the optical sensor 126 is detecting external light, the optical sensor 126 outputs a detection signal indicating the approach of the object. The CPU 110 detects the approach of the object based on the output (or change) of the detection signal. The present embodiment uses an optical sensor, but it is also possible to use other sensors such as a temperature sensor, a magnetic sensor, an ultrasonic sensor, a motion sensor, a vibration sensor, a mechanical contact structure and an electrostatic sensor, as long as the approach of an object to the MFP 101 can be detected.

A human presence sensor 127 detects whether or not there is a person around the MFP 101. The human presence sensor 127 is used to detect the approach of an object to the MFP 101, as with the optical sensor 126. As the human presence sensor 127, it is possible to use sensors that use detection methods that, for example, detect infrared rays emitted from a person, use reflection of ultrasound waves, use reflection of light, and use an arrayed optical sensor. An operation unit control circuit 128 controls the switch 123, the LED 124, the LCD 125, the optical sensor 126 and the human presence sensor 127. The operation unit control circuit 128 performs detection of the press signal from the switch 123, control of lighting and unlighting of the LED 124, and control of display of the LCD 125.

Figure 2:
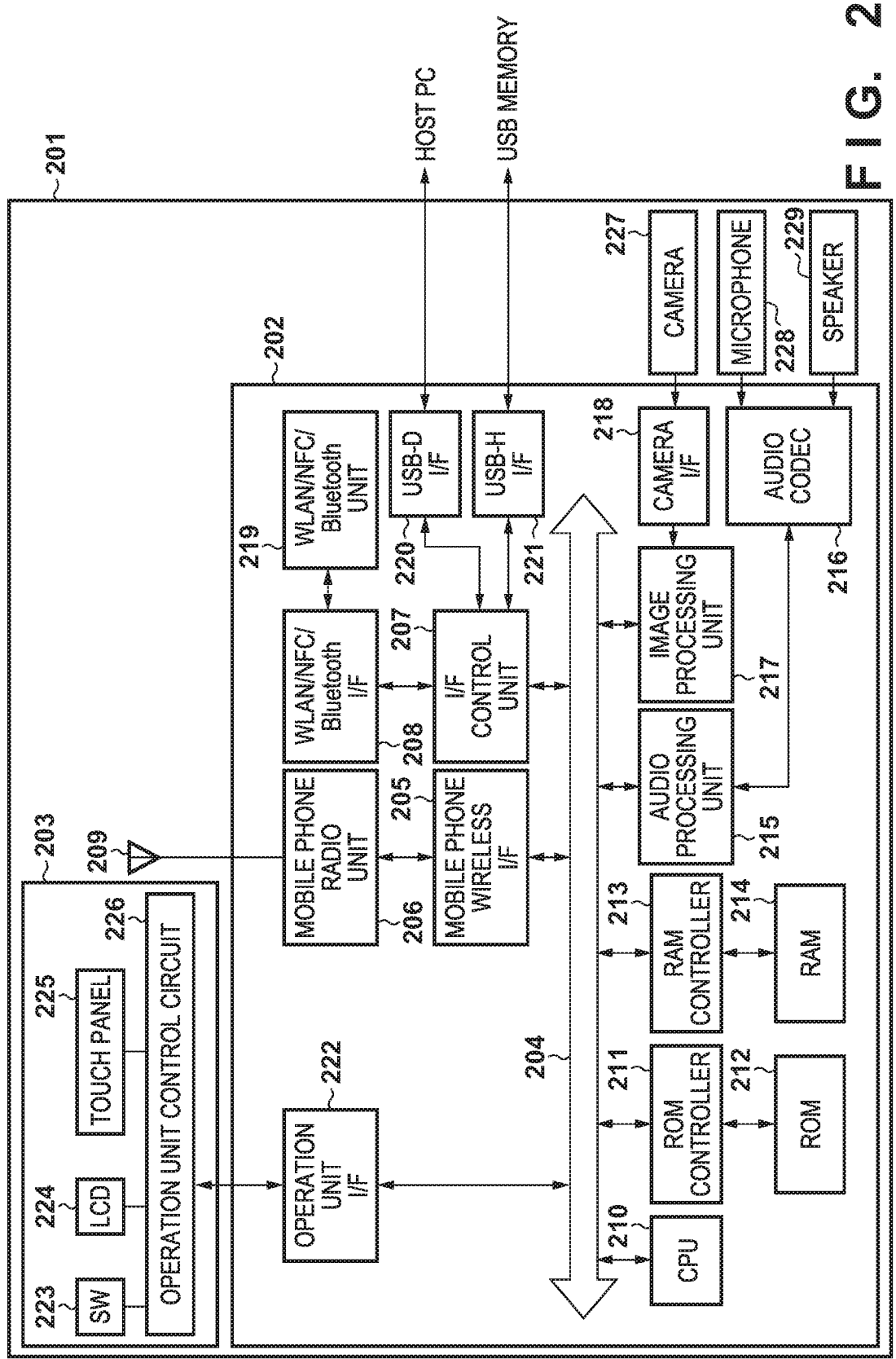
FIG. 2 is a block diagram showing an internal configuration of a mobile terminal.

FIG. 2 is a block diagram showing an internal configuration of a mobile terminal according to the present embodiment. A mobile terminal control unit 202 is implemented by mounting various types of electric components such as an LSI, an IC and the like on a printed circuit board. The mobile terminal control unit 202 performs overall control on the entire mobile terminal 201. The mobile terminal control unit 202 performs operations such as, for example, connecting to a mobile phone communication network so as to perform transmission and reception of data, reading image data (image data) from a camera 227, inputting an audio signal from a microphone 228, and outputting an audio signal from a speaker 229.

An operation unit 203 accepts an input of an instruction from the user via keys, a touch panel or the like, and displays various types of information such as apparatus information and job information on the panel for the user. As shown in FIG. 2, a system bus 204 is a system bus for enabling transmission and reception of data between blocks.

A mobile phone wireless I/F 205 controls communication between a mobile phone radio unit 206 and the system bus 204. The mobile phone radio unit 206 includes a physical layer that performs wireless communication such as high-frequency circuitry, and connects to a mobile phone network so as to perform transmission and reception of data.

An I/F control unit 207 performs transmission and reception of jobs, image data and the like between a RAM 214 and external I/Fs such as a WLAN/NFC/Bluetooth I/F 208, a USB-D I/F 220, and a USB-H I/F 221. The WLAN/NFC/Bluetooth I/F 208 performs interface control with a WLAN/NFC/Bluetooth unit 219. An antenna 209 is an antenna for connecting to a mobile phone network.

A CPU 210 provides instructions to the blocks via the system bus 204 so as to perform overall control on the mobile terminal 201. Here, the CPU 210 encompasses an LSI configuration in which a CPU and hardware circuits, each implementing functional blocks, are included in the same package. The CPU 210 implements the operations according to the present embodiment by reading and executing a program stored in a ROM 212.

The ROM controller 211 controls reading and writing of data with respect to the ROM 212. The ROM 212 is a non-volatile memory that stores therein a boot program for activating an OS of the mobile terminal 201 and a program for performing overall control on the entire mobile terminal 201. The ROM 212 stores therein programs for performing control of WLAN protocols, control of Bluetooth or NFC protocols, control of transmission and reception of data, control of display, and the like.

A RAM controller 213 controls reading and writing of data with respect to the RAM 214. The RAM 214 is a volatile memory that acts as a main memory of the mobile terminal control unit 202, and that is capable of high-speed reading and writing, which is also used as a work area for use in image forming processing and an area for extraction for deploying data to perform image input/output processing. In the RAM 214, data transmitted or received by WLAN, data transmitted or received by Bluetooth or NFC, and the like are also temporarily stored.

An audio processing unit 215 controls reading and writing of an audio signal with respect to an audio codec 216. An image processing unit 217 executes image processing on image data output from the camera 227. The audio codec 216 encodes an audio signal and decodes an encoded audio signal. A camera I/F 218 receives an input of an image signal from the camera 227 and converts the signal into image data.

The WLAN/NFC/Bluetooth unit 219 performs transmission and reception of data to and from a device with which WLAN communication is possible, and also performs transmission and reception of data to and from a device with which NFC or Bluetooth communication is possible. In the present embodiment, a wireless communication scheme according to the IEEE 802.11 standard is used as WLAN. However, it is also possible to use any other communication scheme as long as it is a communication scheme in which the communication distance is longer than that of NFC or Bluetooth, which is another communication scheme. Also, in the present embodiment, NFC or Bluetooth is used. However, it is also possible to use any other communication scheme as long as it is a communication scheme in which the communication distance is shorter than that of WLAN, which is another communication scheme.

The USB-D I/F 220 controls communication with an external device via a USB. The USB-H I/F 221 controls communication with a storage medium that can be removably inserted such as a USB storage unit. The operation unit I/F 222 control communication with the operation unit 203.

A switch (SW) 223 is a switch that can be operated by the user such as a hardware key. The CPU 210 detects a press operation performed by the user based on a press signal output from the switch 223. An LCD 224 is a display having a dot matrix structure for displaying characters and graphics. A touch panel 225 detects the position, pressure and the like of a user's finger. An operation unit control circuit 226 controls the switch 223, the LCD 224, and the touch panel 225. The operation unit control circuit 226 performs, for example, detection of the press signal from the switch 223 and control of display of the LCD 224.

The camera 227 outputs image data obtained by capturing an image. The microphone 228 receives an input of an audio signal such as telephone conversation of the user. The speaker 229 outputs an audio signal by emitting the audio signal into the air.

Figure 3:
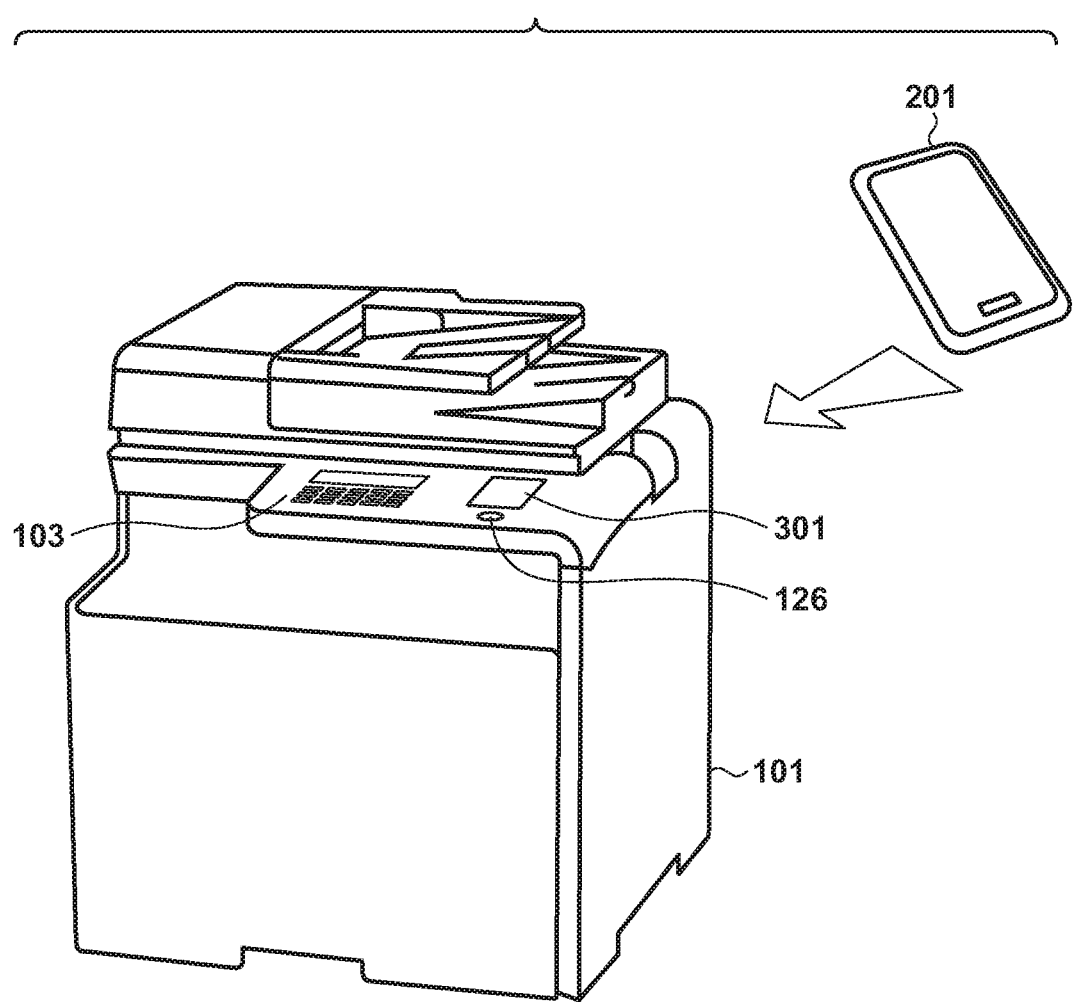
FIG. 3 is a diagram showing the appearance of a system including the image forming apparatus and the mobile terminal shown in FIGS. 1 and 2.

FIG. 3 is a diagram showing the appearance of a communication system including the image forming apparatus and the mobile terminal shown in FIGS. 1 and 2. With the communication system shown in FIG. 3, when the mobile terminal 201 is brought closer to the MFP 101 within a predetermined distance defined by a wireless communication method, the mobile terminal 201 and the MFP 101 can perform communication with each other by the wireless communication method. An area 301 provided on the MFP 101 is an area to which the user places the mobile terminal 201 closer so as to perform a handover operation. In order to prompt the user to perform a touch operation, the area 301 is provided with a mark indicating that the area is a touch area. By prompting the user to perform a touch operation in this way, it is possible to reliably transmit connection information for connecting to a WLAN in close proximity, and thus prevent the connection information from being erroneously transmitted. Also, the optical sensor 126 is disposed so as to be capable of detecting an object approaching to the area 301. Furthermore, the Bluetooth unit 106 is disposed such that if the mobile terminal 201 is near the area 301, the Bluetooth unit 106 can determine that the mobile terminal 201 is within the Bluetooth communication distance.

In the present embodiment, in response to the mobile terminal 201 receiving connection information for connecting to a WLAN by Bluetooth, a handover operation for connecting to the WLAN is performed. In the following description, WiFi connection information is used as an example of the connection information for connecting to a WLAN. Hereinafter, the handover operation will be described with reference to FIGS. 4, 5, 6 and 7. The operations of the mobile terminal 201 are implemented by, for example, the CPU 210 reading a program stored in the ROM 212 into the RAM 214 and executing the program. The operations of the Bluetooth unit 106 in the MFP 101 are implemented by, for example, a CPU (not shown) included in the Bluetooth unit 106 reading and executing a program stored in a ROM (not shown) included in the Bluetooth unit 106. The operations of the MFP control unit 102 are implemented by the CPU 110 reading a program stored in the ROM 112 into the RAM 114 and executing the program.

Figure 4:
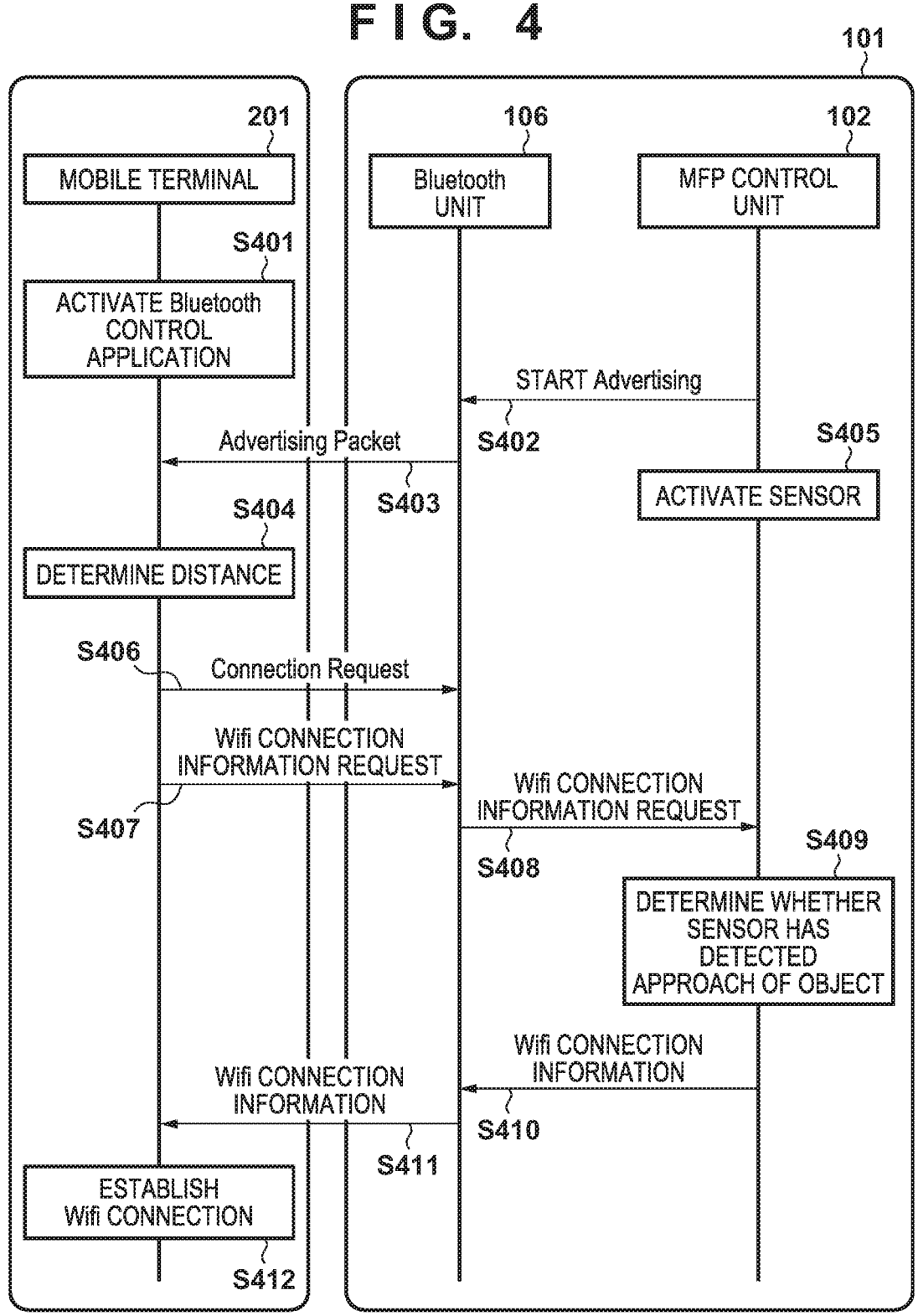
FIG. 4 is a diagram showing a communication sequence between the image forming apparatus and the mobile terminal.

FIG. 4 is a diagram showing a communication sequence between the mobile terminal 201, the Bluetooth unit 106 and the MFP control unit 102 according to the present embodiment. A description will be given of the case where the optical sensor 126 detects the approach of an object, and thereafter makes a WiFi connection, with reference to FIG. 4.

In S401, the user of the mobile terminal 201 activates a Bluetooth control application that controls Bluetooth communication operations. The Bluetooth control application performs operations such as, for example, determining the distance from the MFP 101 and acquiring connection information for making a WiFi connection.

In S402, the MFP control unit 102 issues an instruction to start an advertising operation to the Bluetooth unit 106. This instruction is issued at a predetermined time interval. The advertising operation refers to an operation of regularly transmitting an advertising packet, performed by the Bluetooth unit 106. By transmitting the advertising packet, the Bluetooth unit 106 waits for a connection request from a Bluetooth device. The advertising packet includes transmission power data, a serial number for identifying an individual MFP, address data, and the like.

In S403, the mobile terminal 201 receives the advertising packet transmitted in accordance with Bluetooth protocols. In S404, the mobile terminal 201 determines the distance to the MFP 101. The distance to the MFP 101 can be derived based on the transmission power data included in the advertising packet and an RSSI value acquired when the mobile terminal 201 actually received radio waves. As used herein, the RSSI value refers to the intensity of radio waves actually received by the mobile terminal 201. If it is determined that the distance is less than a predetermined value, the mobile terminal 201 performs operations in S406 and subsequent steps. If, on the other hand, it is determined that the distance is greater than or equal to the predetermined value, the mobile terminal 201 again waits for an advertising packet to be received.

In S405, the MFP control unit 102 activates the optical sensor 126 by supplying power thereto. The activation of the optical sensor 126 may be performed in synchronization with the issuance of the instruction to start an advertising operation.

In S406, the mobile terminal 201 transmits a connection request packet for requesting a WiFi connection to the Bluetooth unit 106. When the Bluetooth unit 106 receives the connection request packet, a Bluetooth connection is established between the mobile terminal 201 and the Bluetooth unit 106. As a result, thereafter, Bluetooth communication becomes possible.

In S407, the mobile terminal 201 transmits a packet including WiFi connection information request command for requesting transmission of WiFi connection information for making a WiFi connection to the Bluetooth unit 106. The WiFi connection information includes, for example, a data set required to make a WiFi connection such as SSID and a WPA connection key. In S408, the Bluetooth unit 106 analyzes the packet received in S407, and transfers the WiFi connection information request command to the MFP control unit 102.

In S409, the MFP control unit 102 determines whether or not the optical sensor 126 has detected the approach of an object. If, for example, the user performs an operation such as placing the hand holding the mobile terminal 201 over the MFP 101, and as a result, the light input into the optical sensor 126 undergoes a series of predetermined changes such as bright, dark and bright, the MFP control unit 102 determines that an object is approaching. Hereinafter, processing performed after the optical sensor 126 has detected the approach of an object will be described.

In S410, the MFP control unit 102 controls the Bluetooth unit 106 to transmit WiFi connection information to the mobile terminal 201. In S411, the Bluetooth unit 106 transmits a packet including the WiFi connection information by Bluetooth, and the mobile terminal 201 receives the transmitted packet including the WiFi connection information.

In S412, the mobile terminal 201 makes a WiFi connection (handover) to the MFP 101 based on the received WiFi connection information, and starts WiFi communication.

Figure 5:
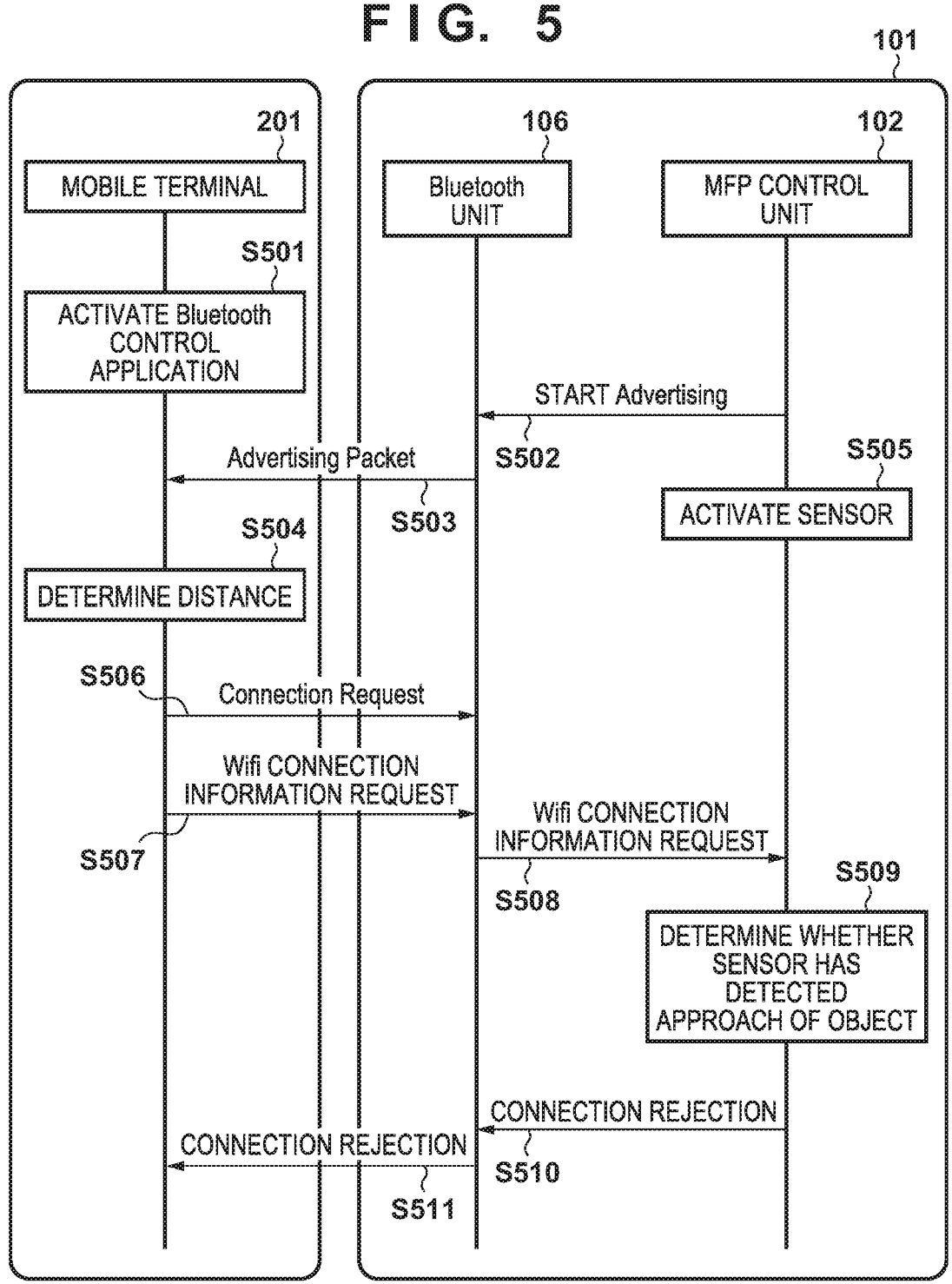
FIG. 5 is a communication sequence performed in the case where an optical sensor does not detect the approach of an object.

FIG. 5 is a diagram showing the case where the optical sensor 126 does not detect the approach of an object, and a WiFi connection is rejected in the communication sequence shown in FIG. 4. Steps S501 to S509 are the same as steps S401 to S409 shown in FIG. 4.

In S510, the MFP control unit 102 controls the Bluetooth unit 106 to transmit "connection rejection" information to the mobile terminal 201. In S511, the Bluetooth unit 106 transmits a packet including the "connection rejection" information by Bluetooth, and the mobile terminal 201 receives the transmitted packet including the "connection rejection" information.

After that, for example, the mobile terminal 201 terminates the Bluetooth connection, and repeats the processing from S501.

Figure 6:
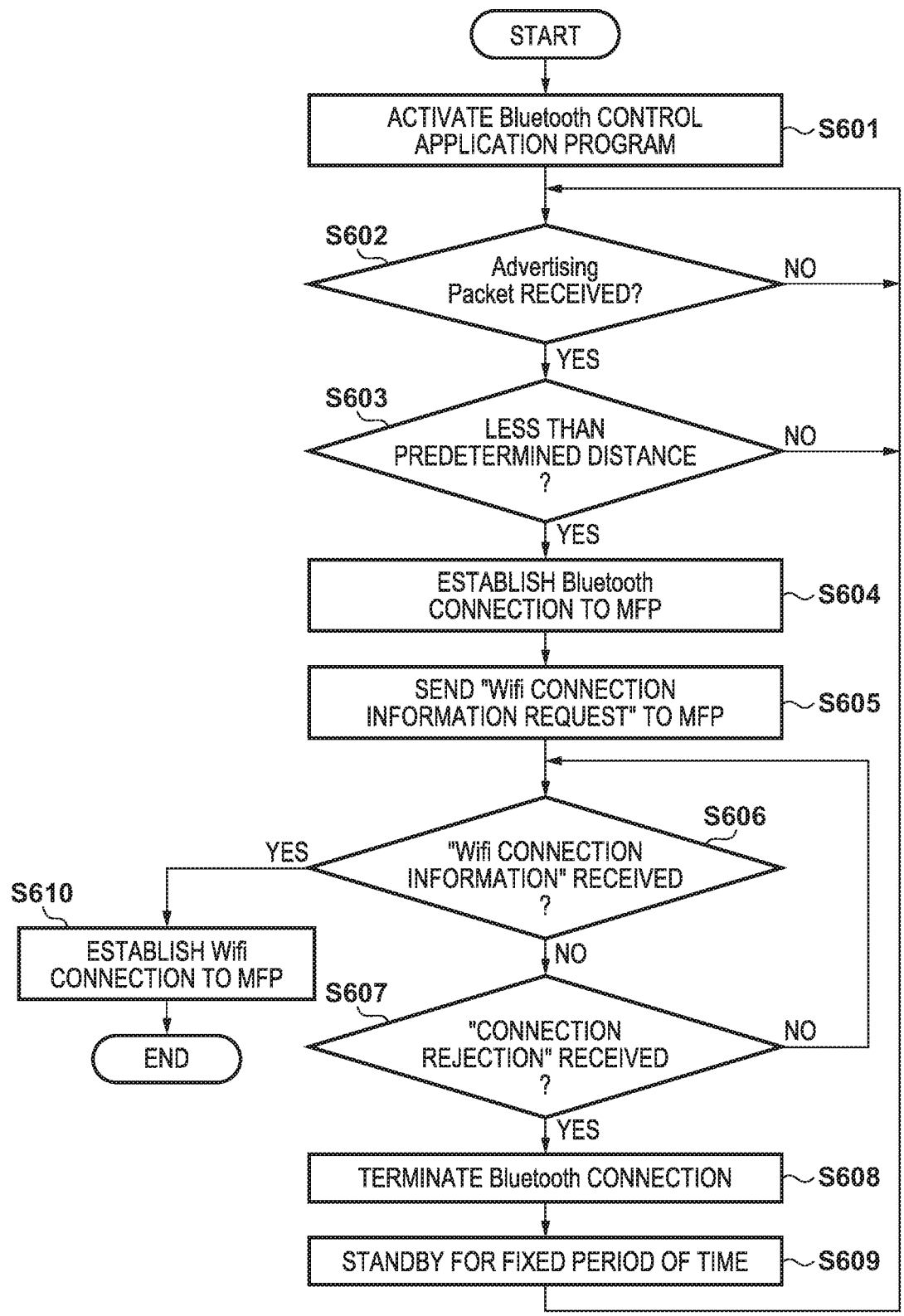
FIG. 6 is a flowchart illustrating a procedure of processing performed by the mobile terminal.

FIG. 6 is a flowchart illustrating a procedure of processing performed by the mobile terminal 201.

In S601, the CPU 210 accepts the activation of the Bluetooth control application program of the mobile terminal 201 performed by the user. In S602, the CPU 210 determines whether or not the advertising packet transmitted from the MFP 101 has been received. In this step, if it is determined that the advertising packet has been received, the processing advances to S603. If it is determined that the advertising packet has not been received, the processing in S602 is repeated.

In S603, the CPU 210 determines whether or not the distance between the mobile terminal 201 and the MFP 101 is less than a predetermined distance. In this step, if it is determined that the distance is less than the predetermined distance, the processing advances to S604. If it is determined that the distance is not less than the predetermined distance, the processing in S602 is repeated.

In S604, the CPU 210 establishes a Bluetooth connection to the MFP 101 by transmitting a connection request packet. In S605, the CPU 210 transmits a WiFi connection information request command to the MFP 101.

In S606, the CPU 210 determines whether or not WiFi connection information has been received from the MFP 101. In this step, if it is determined that WiFi connection information has been received, the processing advances to S610. If it is determined that WiFi connection information has not been received, the processing advances to S607.

In S607, the CPU 210 determines whether or not "connection rejection" information has been received from the MFP 101. In this step, if it is determined that "connection rejection" information has been received, the processing advances to S608. If it is determined that "connection rejection" information has not been received, the processing in S606 is repeated. In S608, the CPU 210 terminates the Bluetooth connection. In S609, the CPU 210 is put on standby for a fixed (predetermined) period of time by using a timer function or the like, and thereafter repeats the processing in S602.

If it is determined in S606 that WiFi connection information has been received from the MFP 101, in S610, the CPU 210 makes a WiFi connection to the MFP 101 by using the received WiFi connection information.

Figure 7:
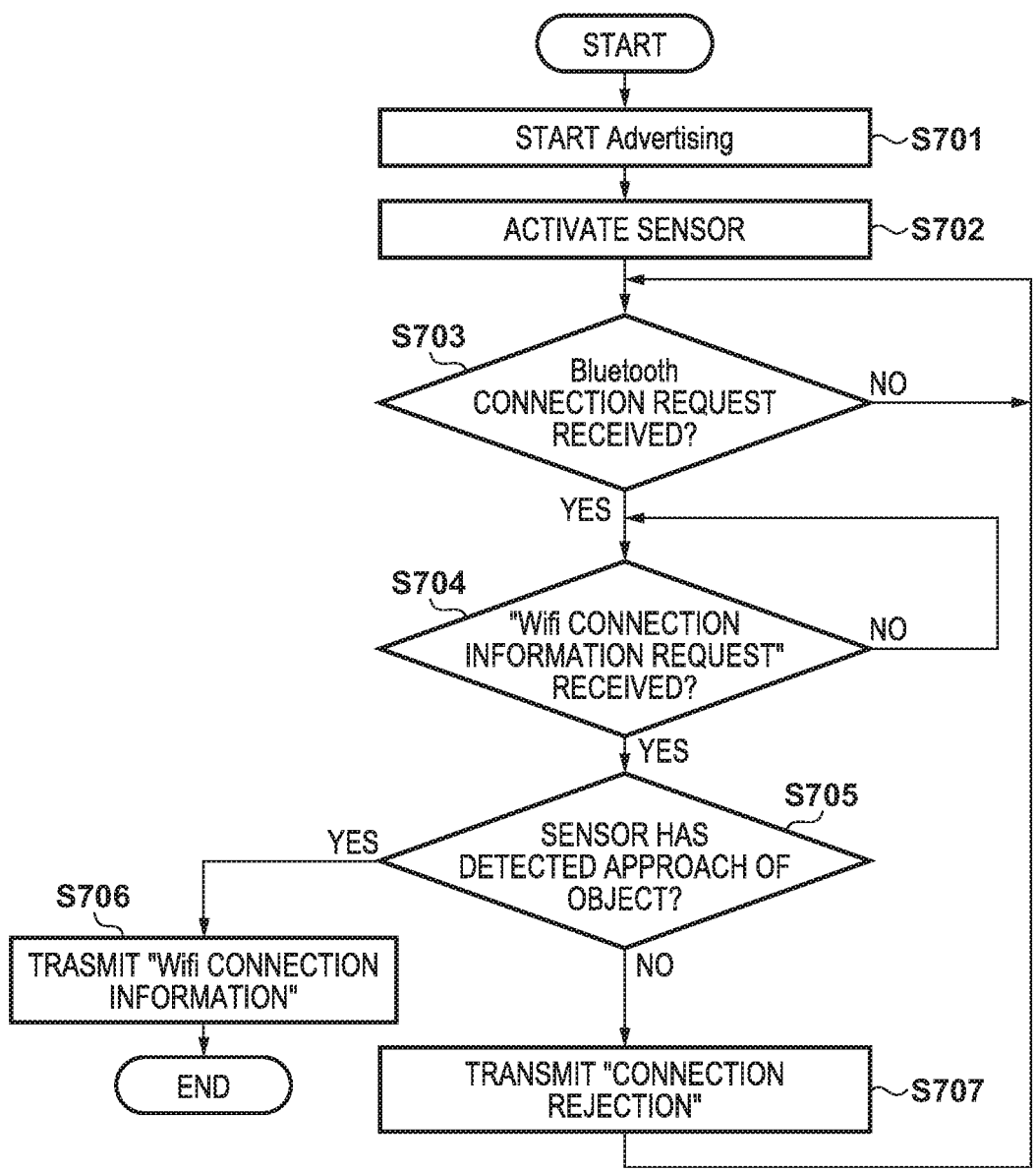
FIG. 7 is a flowchart illustrating a procedure of processing performed by the MFP.

FIG. 7 is a flowchart illustrating a procedure of processing performed by the MFP 101.

In S701, the MFP control unit 102 starts the advertising operation described with reference to FIGS. 4 and 5. In S702, the MFP control unit 102 activates the optical sensor 126 through an operation of supplying power or the like.

In S703, the Bluetooth unit 106 determines whether or not a Bluetooth connection request has been received from an external information device. The determination is made by, for example, determining whether or not a connection request packet has been received. In this step, if it is determined that the connection request has been received, the processing advances to S704. If it is determined that the connection request has not been received, the processing in S703 is repeated.

In S704, the Bluetooth unit 106 determines whether or not a WiFi connection information request has been received. In this step, if it is determined that a WiFi connection information request has been received, the processing advances to S705. If it is determined that a WiFi connection information request has not been received, the processing in S704 is repeated.

In S705, the MFP control unit 102 determines whether or not the optical sensor 126 has detected the approach of an object. In this step, if it is determined that the optical sensor 126 has detected the approach of an object, the processing advances to S706. If it is determined that the optical sensor 126 has not detected the approach of an object, the processing advances to S707.

In S706, the MFP control unit 102 controls the Bluetooth unit 106 to transmit WiFi connection information to the mobile terminal 201 by Bluetooth. After S706 has been performed, the processing of FIG. 7 ends. In S707, the MFP control unit 102 controls the Bluetooth unit 106 to transmit "connection rejection" information to the mobile terminal 201 by Bluetooth. After S707 has been performed, the processing in S703 is repeated.

As described above, in the present embodiment, in the case of performing a handover from Bluetooth to WLAN, if the optical sensor detects the presence of a user near the MFP, the MFP transmits connection information to the mobile terminal by Bluetooth. As a result, even when a communication method that derives the distance based on the intensity of radio waves such as Bluetooth is used, it is possible to prevent connection information from being transmitted in a location where the user does not intend to establish a connection, or prevent erroneous transmission between MFPs in close distance to each other from occurring, and thus a reduction in the accuracy of handover can be prevented.

The present embodiment has been described using Bluetooth as a short range wireless communication method, but a communication method other than Bluetooth may be used as long as it is a wireless communication method in which the communication distance is shorter than that of WLAN.

Second Embodiment

In the present embodiment, control is performed as to whether to execute a handover after the optical sensor 126 has detected the approach of an object, or to execute a handover regardless of whether the optical sensor 126 has detected the approach of an object, by an instruction issued from the mobile terminal 201. In other words, an instruction as to whether the determination of detection of the approach of an object needs to be performed or skipped can be issued from the mobile terminal 201.

In the present embodiment, the case will be described where an instruction is issued from the mobile terminal 201, by using a specific application, for example, a print application, to one of a plurality of MFPs found by Bluetooth communication so as to cause the MFP to execute a print operation. The operations of the mobile terminal 201 described below are implemented by the CPU 210 reading and executing a program stored in the ROM 211. The operations of the Bluetooth unit 106 in the MFP 101 are implemented by a CPU (not shown) included in the Bluetooth unit 106 reading and executing a program stored in a ROM (not shown) included in the Bluetooth unit 106. Likewise, the operations of the MFP control unit 102 are implemented by the CPU 110 reading a program stored in the ROM 112 into the RAM 114 and executing the program. The following description will be given by using WiFi connection information as an example of connection information for connecting to a WLAN.

Figure 8:
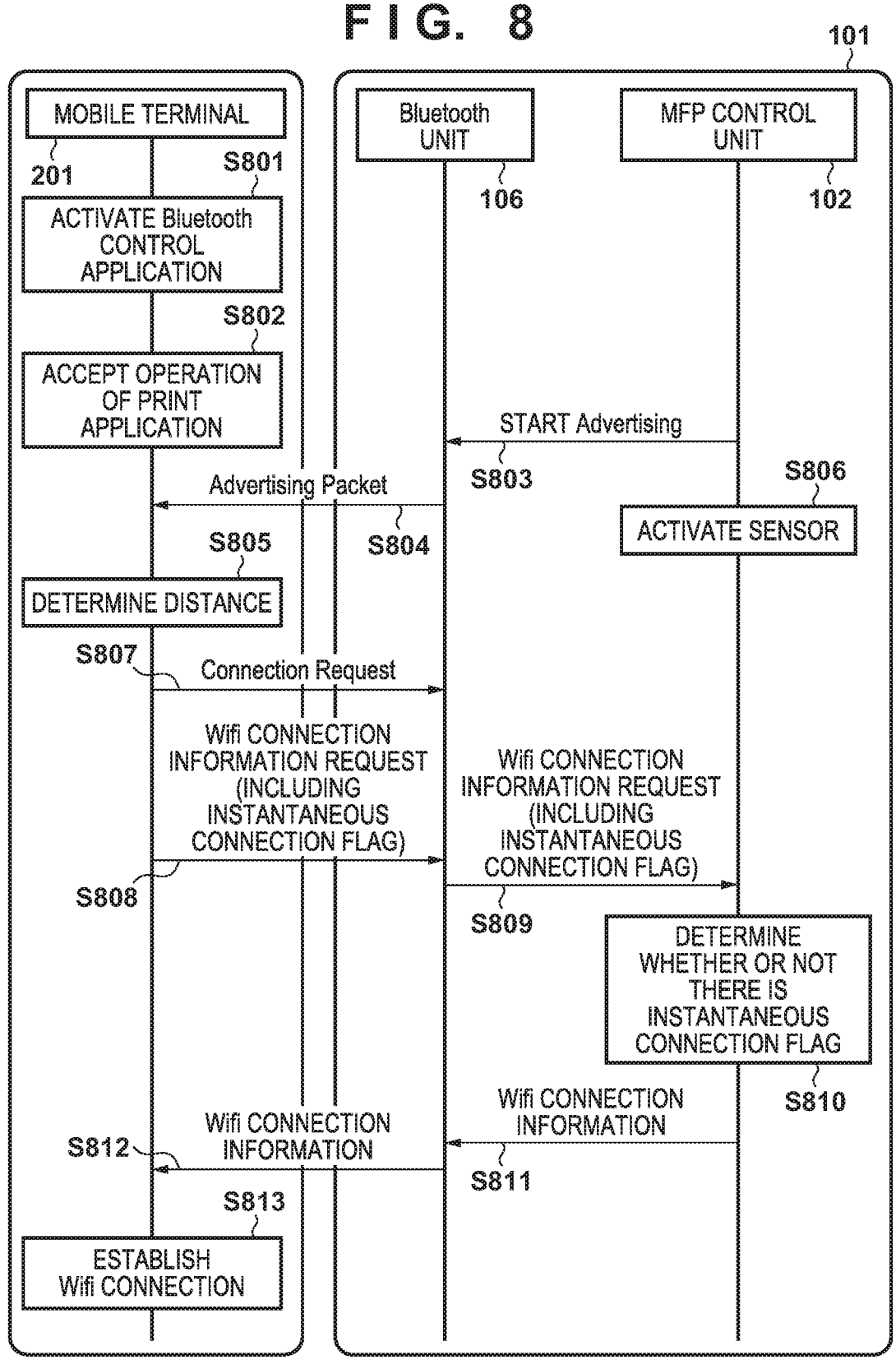
FIG. 8 is a diagram showing a communication sequence between the image forming apparatus and the mobile terminal.

FIG. 8 is a diagram showing a communication sequence between the mobile terminal 201, the Bluetooth unit 106 and the MFP control unit 102 according to the present embodiment. The case where an MFP used to perform printing is designated from the mobile terminal 201 by using a print application will be described with reference to FIG. 8.

Steps S801, S803 to S807, and S811 to S813 are the same as steps S401, S402 to S406, and S410 to S412 shown in FIG. 4, respectively.

In S802, the user of the mobile terminal 201 activates a print application. The print application transmits image data selected by the user to a specific MFP that can print the image data. At this time, the user can select and designate the specific MFP. In S802, the user selects, on the print application, an image to be printed and an MFP used to execute printing.

In S808, the mobile terminal 201 transmits, to the Bluetooth unit 106, a packet including a WiFi connection information request command for requesting transmission of WiFi connection information for making a WiFi connection. The WiFi connection information includes a data set required to make a WiFi connection such as SSID and a WPA connection key.

In S808, the same operation as that in S407 shown in FIG. 4 is performed. However, the WiFi connection information request command is different from that used in S407 shown in FIG. 4 in that an "instantaneous connection flag" is added. The instantaneous connection flag refers to a flag for instructing the MFP 101 to transmit WiFi connection information to the mobile terminal 201 regardless of whether or not the approach of an object has been detected by the optical sensor 126. In the first embodiment, the instantaneous connection flag is not added, but it is possible to use a configuration in which the WiFi connection information request command includes the instantaneous connection flag, and in the first embodiment, a setting is made to disable the instantaneous connection flag. In the case of this configuration, in the present embodiment, a setting is made to enable the instantaneous connection flag.

In S809, the Bluetooth unit 106 analyzes the packet received in S808, and transfers the WiFi connection information request command including the instantaneous connection flag to the MFP control unit 102.

In S810, the MFP control unit 102 determines whether or not the instantaneous connection flag is included (or whether or not the instantaneous connection flag is enabled). In this step, if it is determined that the instantaneous connection flag is included, in S811, the MFP control unit 102 controls the Bluetooth unit 106 to transmit WiFi connection information, regardless of the result of detection of the approach of an object by the optical sensor 126. In the case of a configuration in which the instantaneous connection flag is constantly included, a determination may be made as to whether or not the instantaneous connection flag is enabled.

Through the operations described above, if it is determined in S808 that the instantaneous connection flag is not included in the WiFi connection information request command, or that the instantaneous connection flag is disabled even if the instantaneous connection flag is included, the operations according to the first embodiment are performed.

Figure 9:
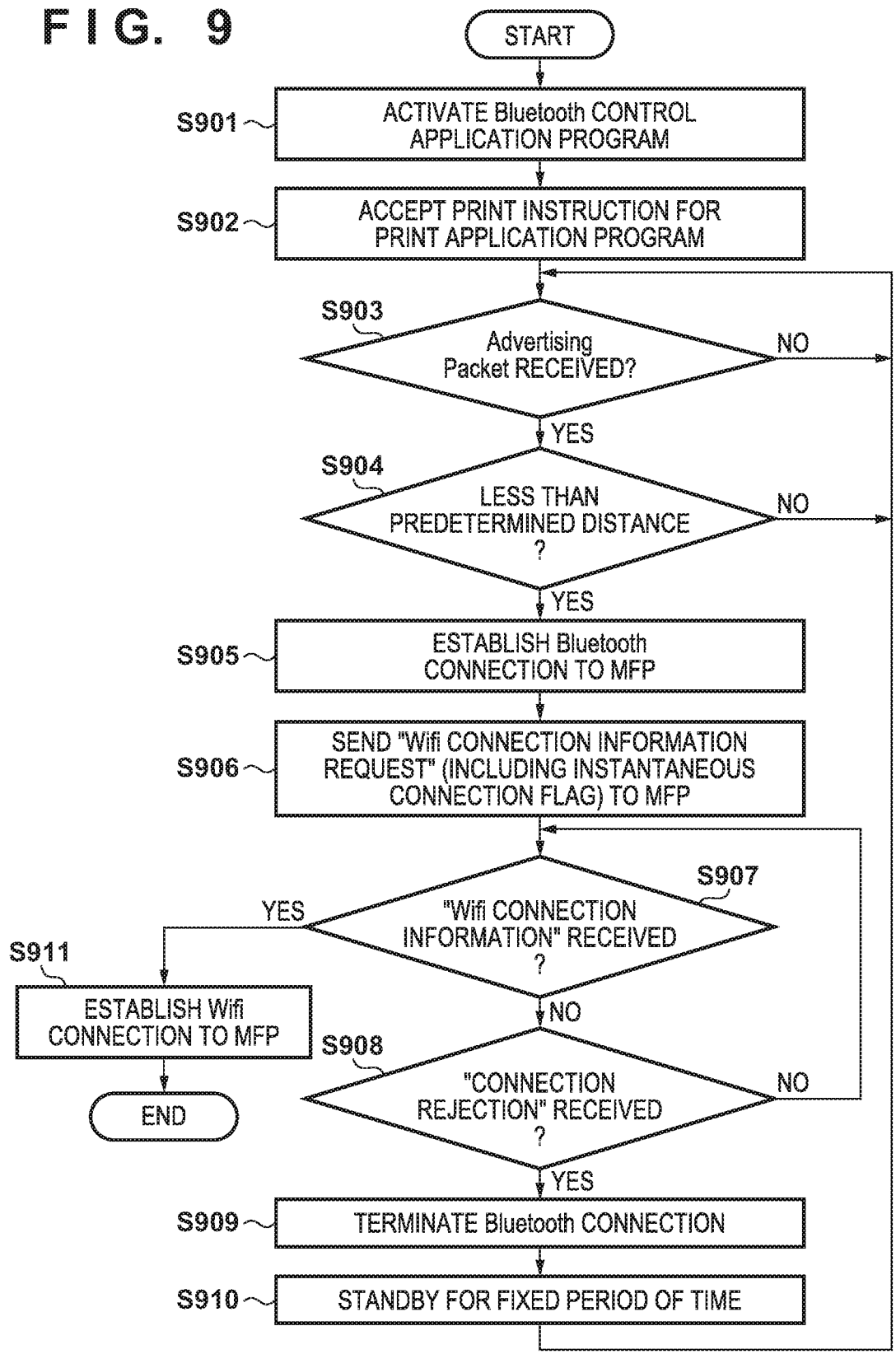
FIG. 9 is a flowchart illustrating a procedure of processing performed by the mobile terminal.

FIG. 9 is a flowchart illustrating a procedure of processing performed by the mobile terminal 201.

S901 is the same as S601 shown in FIG. 6. In S902, the CPU 210 accepts an activation of the print application program of the mobile terminal 201 performed by the user. Furthermore, the CPU 210 accepts a selection of an image to be printed and a selection of an MFP used to perform printing, which are made by the user. Steps S903 to S905 are the same as steps S602 to S604 shown in FIG. 6.

In S906, the CPU 210 transmits the WiFi connection information request command including the instantaneous connection flag (or the WiFi connection information request command in which instantaneous connection flag is enabled) to the MFP 101. Steps S907 to S911 are the same as steps S606 to S610 shown in FIG. 6.

Figure 10:
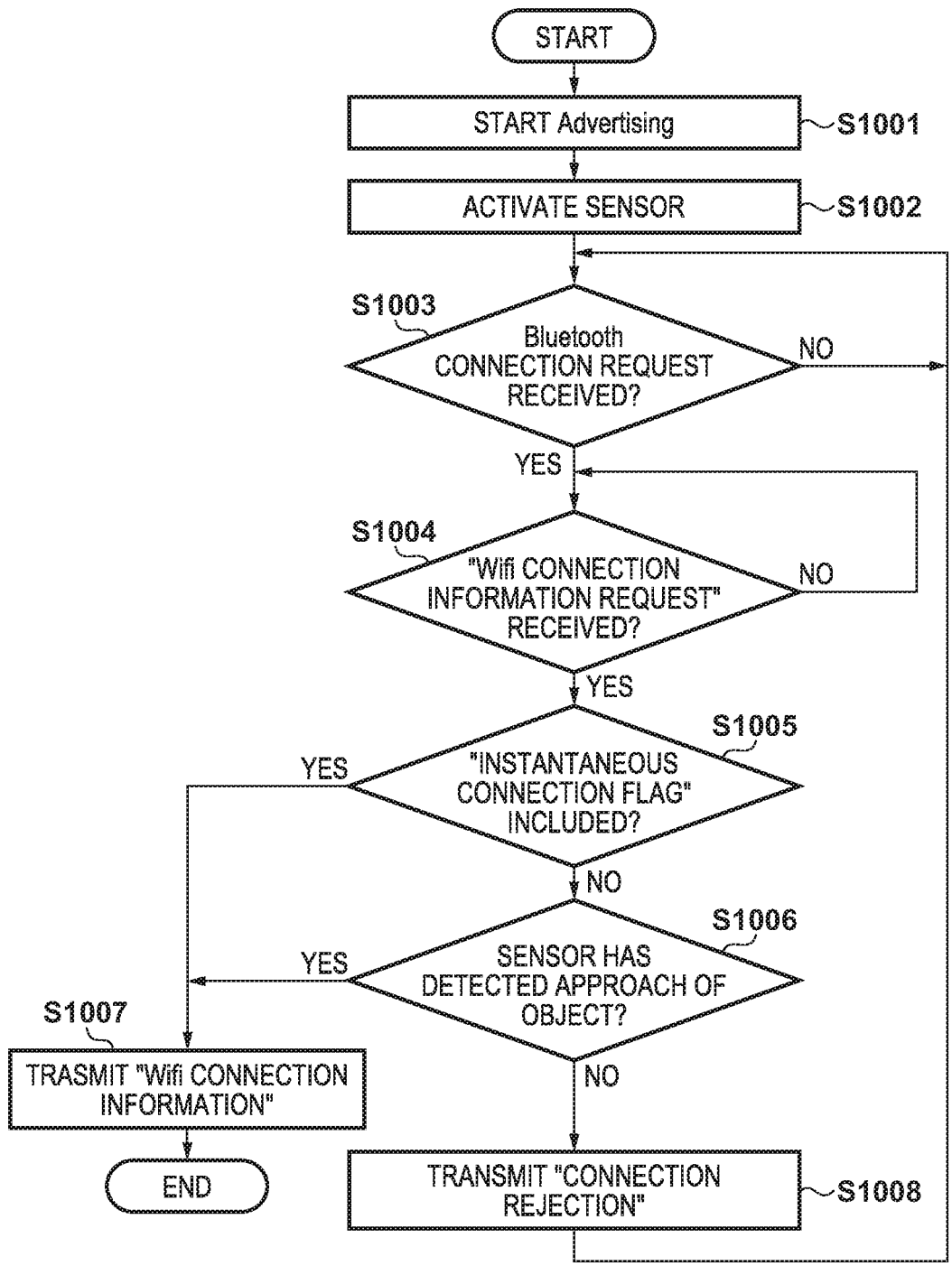
FIG. 10 is a flowchart illustrating a procedure of processing performed by the MFP.

FIG. 10 is a flowchart illustrating a procedure of processing performed by the MFP 101.

Steps S1001 to S1004 are the same as steps S701 to S704 shown in FIG. 7. In S1005, the MFP control unit 102 determines whether or not the WiFi connection information request command received in S1004 includes the instantaneous connection flag. In this step, if it is determined that the instantaneous connection flag is included, the procedure advances to S1007. If it is determined that the instantaneous connection flag is not included, the procedure advances to S1006. Here, in S1005, a determination may be made as to whether or not the instantaneous connection flag is enabled. In this case, if it is determined that the instantaneous connection flag is enabled, the procedure advances to S1007. If it is determined that the instantaneous connection flag is not enabled, the procedure advances to S1006. Steps S1006 to S1008 are the same as steps S705 to S707 shown in FIG. 7.

As described above, in the present embodiment, in the case of performing a handover from Bluetooth to WLAN, an instruction to transmit connection information can be issued regardless of whether the approach of an object has been detected by the optical sensor. As a result, if the mobile terminal can reliably acquire the connection information for connecting to a WLAN, the operation of detection performed by the optical sensor can be skipped, and thus the time required for handover processing can be shortened.

Third Embodiment

In the present embodiment, the human presence sensor 127 that detects the presence of a human body is used instead of the optical sensor 126. As the human presence sensor 127, any sensor can be used as long as the presence of a human body can be detected. For example, a motion sensor that detects reflection of infrared rays, or a pyroelectric sensor can be used.

The operations of the mobile terminal 201 described below are implemented by the CPU 210 reading and executing a program stored in the ROM 211. The operations of the Bluetooth unit 106 in the MFP 101 are implemented by a CPU (not shown) included in the Bluetooth unit 106 reading and executing a program stored in a ROM (not shown) included in the Bluetooth unit 106. Likewise, the operations of the MFP control unit 102 are implemented by the CPU 110 reading a program stored in the ROM 112 into the RAM 114 and executing the program. The following description will be given by using WiFi connection information as an example of connection information for connecting to a WLAN.

Figure 11:
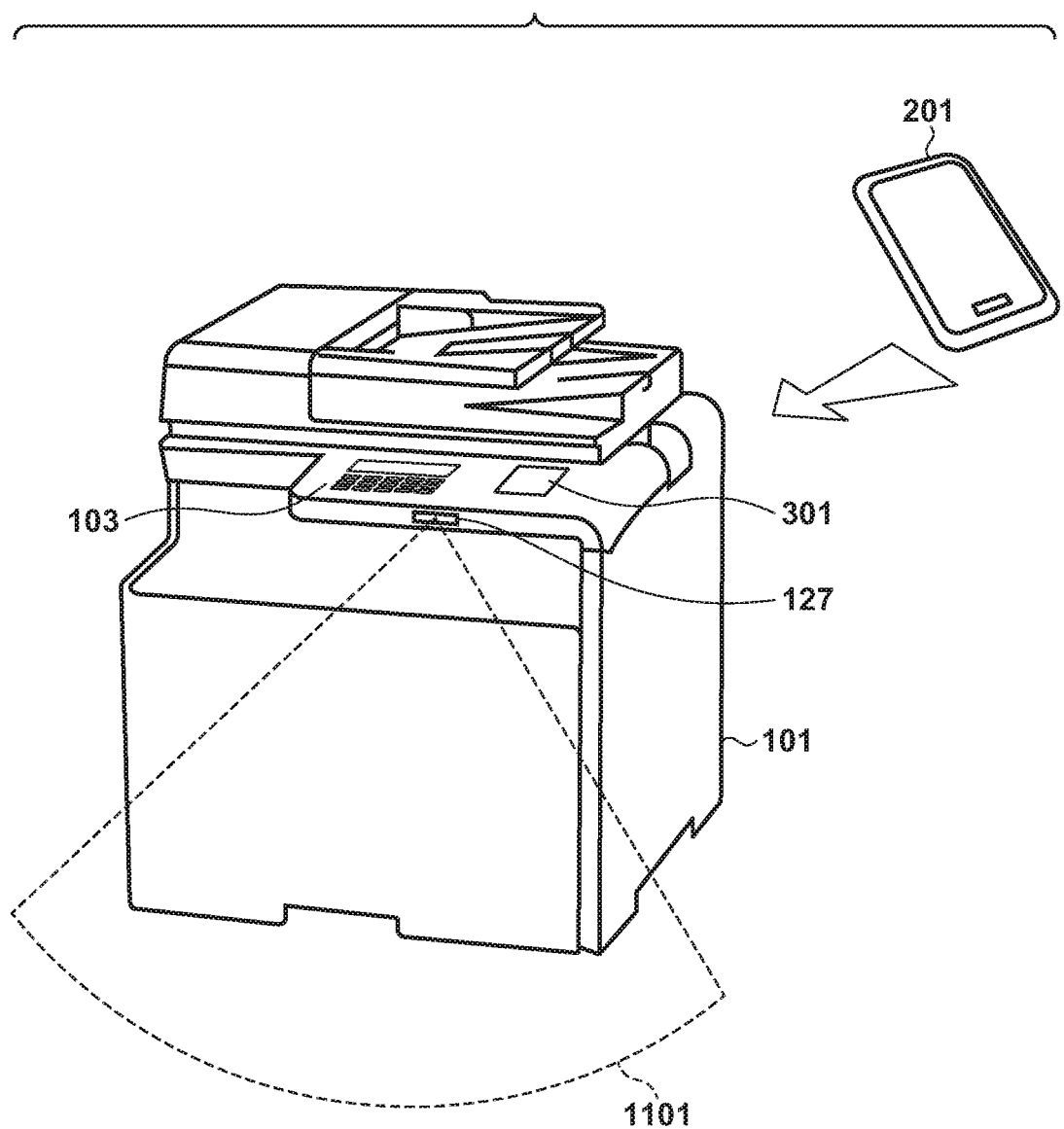
FIG. 11 is a diagram showing the concept of a configuration that uses a human presence sensor.

FIG. 11 is a diagram illustrating the concept of a configuration according to the present embodiment in which the human presence sensor 127 is used. The human presence sensor 127 is provided on the front surface of the MFP 101 so as to have a maximum sensitivity in a region where a human body is likely to be present to operate the operation unit 103, or in other words, in a region 1101 shown in FIG. 11. The human presence sensor 127 may have a configuration in which a plurality of cells are placed in an array, and a cell corresponding to the location where the user is present is responsive.

The Bluetooth unit 106 is configured so as to, if the user operates the mobile terminal 201 within the region 1101, prompt the user to be within a predetermined distance from the Bluetooth unit 106. With this configuration, if the user is within a predetermined region in which the human presence sensor 127 of the MFP 101 is responsive and is within a predetermined distance from the Bluetooth unit 106, a handover operation to a WiFi connection is performed. The operations of the mobile terminal 201 are the same as those described in the first embodiment.

Figure 12:
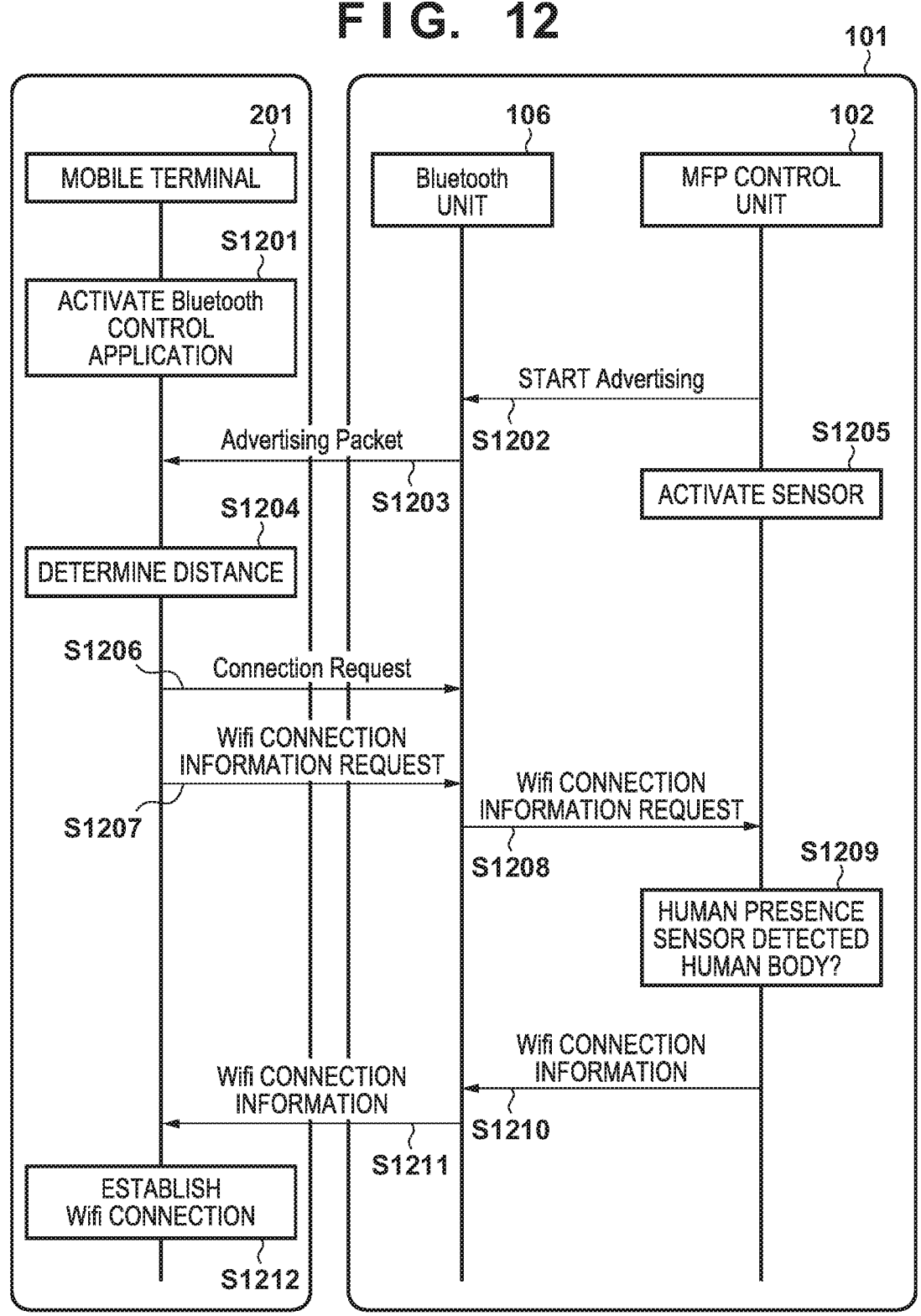
FIG. 12 is a diagram showing a communication sequence between the image forming apparatus and the mobile terminal.

FIG. 12 is a diagram showing a communication sequence between the mobile terminal 201, the Bluetooth unit 106 and the MFP control unit 102 according to the present embodiment.

Steps S1201 to S1208 are the same as steps S401 to S408 shown in FIG. 4. In S1209, the MFP control unit 102 determines whether or not the human presence sensor 127 has detected a human body. In the subsequent steps shown in FIG. 12, a handover to a WiFi connection is performed. Steps S1210 to S1212 are the same as steps S410 to S412 shown in FIG. 4.

Figure 13:
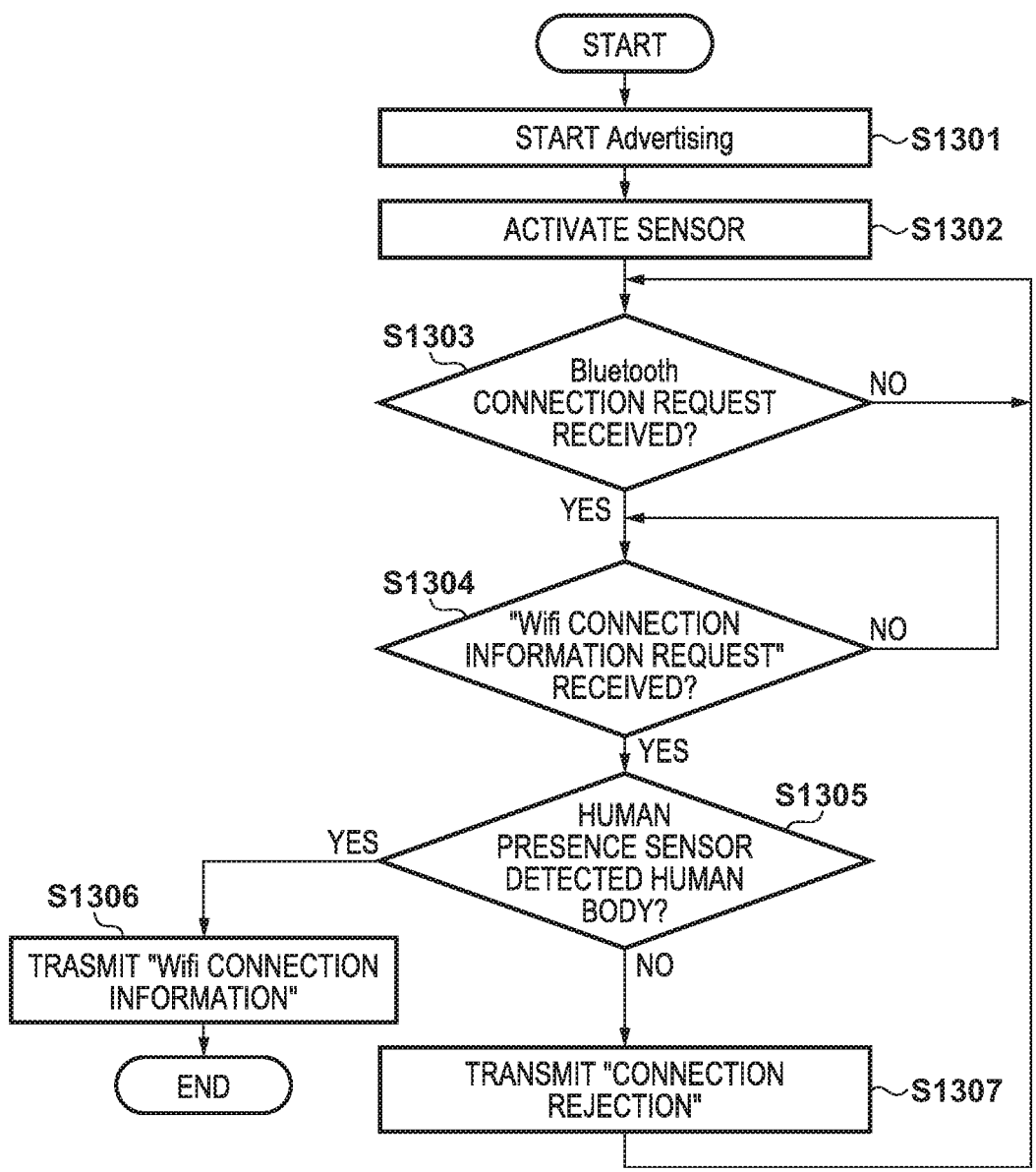
FIG. 13 is a flowchart illustrating a procedure of processing performed by the MFP.

FIG. 13 is a flowchart illustrating a procedure of processing performed by the MFP 101.

Steps S1301 to S1304 are the same as steps S701 to S704 shown in FIG. 7. In S1305, the MFP control unit 102 determines whether or not the human presence sensor 127 has detected a human body. In this step, if it is determined that the human presence sensor 127 has detected a human body, the procedure advances to S1306. If it is determined that the human presence sensor 127 has not detected a human body, the procedure advances to S1307. Steps S1306 and S1307 are the same as steps S706 and S707 shown in FIG. 7.

As described above, in the present embodiment, in the case of performing a handover from Bluetooth to WLAN, if it is determined by the human presence sensor that there is a user near the MFP, the MFP transmits connection information to the mobile terminal by Bluetooth. As a result, even when a communication method that derives the distance based on the intensity of radio waves such as Bluetooth is used, it is possible to prevent connection information from being transmitted in a location where the user does not intend to establish a connection, or prevent erroneous transmission between MFPs in close distance to each other from occurring, and thus a reduction in the accuracy of handover can be prevented.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-055355, filed Mar. 18, 2015, which is hereby incorporated by reference herein in its entirety.

What is claimed is:

1. A communication system in which a mobile terminal and a communication apparatus perform a communication, the system comprises,
the mobile terminal comprising:
a first Bluetooth communicator that performs a communication based on Bluetooth; and
at least one controller configured to:
cause the first Bluetooth communicator to send, to the communication apparatus, a first request for establishing a Bluetooth communication based on a received advertising packet;
send, to the communication apparatus via the established Bluetooth communication, a second request of any one of several types of requests including a first type of request and a second type of request, and
the communication apparatus comprising:
a second Bluetooth communicator that performs a communication based on Bluetooth;
a human presence sensor capable of detecting existence of a person within a limited area which is provided close to a front of the communication apparatus; and
at least one controller configured to:
cause the second Bluetooth communicator to transmit advertising packets to a surrounding area intermittently;

establish, in response to the receiving the first request, the Bluetooth communication between the second Bluetooth communicator and the first Bluetooth communicator; and receive the second request via the established Bluetooth communication, perform processing corresponding to the first type request without depending on a result of detection of the human sensor in a case where the received second request is the first type request, and determine whether to perform processing corresponding to the second type request based on a result of detection of the human sensor in a case where the received second request is the second type request.

2. The system according to claim 1, wherein the at least one controller of the communication apparatus is configured to prohibit the execution of the processing corresponding to the second type request, in a case where it is determined that the result of detection indicates that the existence of the person has not been detected by the human presence sensor.

3. The system according to claim 1, wherein the at least one controller of the communication apparatus is configured to permit the execution of the processing corresponding to the second type request, in a case where it is determined that the result of detection indicates that the existence of the person has been detected by the human presence sensor.

4. The system according to claim 1, wherein the at least one controller of the communication apparatus is configured to cause, instead of the performing of the processing corresponding to the second type request, the second Bluetooth communicator to transmit, to the first Bluetooth communicator, connection rejection information if it is determined that the result of detection indicates that the existence of the person has not been detected by the human presence sensor.

5. The system according to claim 1, wherein the at least one controller of the communication apparatus is configured to cause the second Bluetooth communicator to transmit, to the first Bluetooth communicator, connection information in the processing corresponding to the second type request based on the result of detection of the human sensor.

6. The system according to claim 5, wherein the connection information includes at least SSID.

7. The system according to claim 5, wherein the at least one controller of the communication apparatus is configured to establish a wireless LAN communication between the communication apparatus and the mobile terminal, based on the connection information.

8. The system according to claim 1, wherein a designation on whether to perform the prohibition in accordance with the result of detection is able to be accepted.

9. The system according to claim 1, wherein the human presence sensor is a sensor using at least one of a temperature sensor, a magnetic sensor, an ultrasonic sensor, an optical sensor, a pyroelectric sensor and an infrared ray sensor.

10. The system according to claim 1, wherein the human presence sensor is a sensor in which a plurality of sensors are combined with each other.

11. The system according to claim 1, wherein the communication apparatus includes a printing device which forms an image on a sheet.

12. The system according to claim 1, wherein the communication apparatus includes a reading device which reads a document.

13. The system according to claim 1, wherein the first type request and the second type request are requests having different information from each other.

14. The system according to claim 1, wherein the first type request includes an instantaneous connection flag and the second type request does not include the instantaneous connection flag.

15. A method for a communication system including a mobile terminal having a first Bluetooth communicator and a communication apparatus having a second Bluetooth communicator and a human presence sensor capable of detecting existence of a person, the method comprising:

transmitting, by the second Bluetooth communicator, advertising packets to a surrounding area intermittently;

sending to the second Bluetooth communicator, by the first Bluetooth communicator, a first request for establishing a Bluetooth communication based on a received advertising packet;

establishing, in response to the receiving the first request, the Bluetooth communication between the second Bluetooth communicator and the first Bluetooth communicator;

sending to the second Bluetooth communicator, by the first Bluetooth communicator via the established Bluetooth communication, a second request of any one of several types of requests including a first type of request and a second type of request and receiving the second request via the established Bluetooth communication, performing processing corresponding to the first type request without depending on a result of detection of the human sensor in a case where the received second request is the first type request, and determining whether to perform processing corresponding to the second type request based on a result of detection of the human sensor in a case where the received second request is the second type request.

16. The method according to claim 15, wherein the method is configured to prohibit the execution of the processing corresponding to the second type request, in a case where it is determined that the result of detection indicates that the existence of the person has not been detected by the human presence sensor.

17. The method according to claim 15, wherein the method is configured to permit the execution of the processing corresponding to the second type request, in a case where it is determined that the result of detection indicates that the existence of the person has been detected by the human presence sensor.

18. The method according to claim 15, wherein the method is configured to cause, instead of the performing of the processing corresponding to the second type request, the second Bluetooth communicator to transmit, to the first Bluetooth communicator, connection rejection information if it is determined that the result of detection indicates that the existence of the person has not been detected by the human presence sensor.

19. The method according to claim 15, wherein the method is configured to cause the second Bluetooth communicator to transmit, to the first Bluetooth communicator, connection information in the processing corresponding to the second type request based on the result of detection of the human sensor.

20. The method according to claim 19, wherein the connection information includes at least SSID.

21. The method according to claim 19, wherein the method is configured to establish a wireless LAN communication between the communication apparatus and the mobile terminal, based on the connection information.

22. The method according to claim 15, wherein a designation on whether to perform the prohibition in accordance with the checked result of detection is able to be accepted.

23. The method according to claim 15, wherein the human presence sensor is a sensor using at least one of a temperature sensor, a magnetic sensor, an ultrasonic sensor, an optical sensor, a pyroelectric sensor and an infrared ray sensor.

24. The method according to claim 15, wherein the human presence sensor is a sensor in which a plurality of sensors are combined with each other.

25. The method according to claim 15, wherein the communication apparatus includes a printing device which forms an image on a sheet.

26. The method according to claim 15, wherein the communication apparatus includes a reading device which reads a document.

* * * * *